(12) United States Patent (10) Patent No.: US 8,976,181 B2
Reid et al. (45) Date of Patent: Mar. 10, 2015

(54) SOFTWARE SYSTEM AND METHOD FOR WASTEWATER TREATMENT CONTROL AND INTERPRETATION USING ORP

(75) Inventors: Terence K. Reid, Rockton, IL (US); Michael Hevey, Roscoe, IL (US)

(73) Assignee: Aqua-Aerobic Systems, Inc., Loves Park, IL (US)

( * ) Notice: Subject to any disclaimer, the term of this patent is extended or adjusted under 35 U.S.C. 154(b) by 874 days.

(21) Appl. No.: 13/178,169

(22) Filed: Jul. 7, 2011

(65) Prior Publication Data

US 2013/0009961 A1 Jan. 10, 2013

(51) Int. Cl.
*G09G 5/22* (2006.01)
*G06T 11/20* (2006.01)

(52) U.S. Cl.
CPC .................................. *G06T 11/206* (2013.01)
USPC ........................................ 345/440.1; 345/629

(58) Field of Classification Search
CPC ............................... C02F 2209/04; C02F 1/00
USPC ............................................... 345/440.1, 629
See application file for complete search history.

(56) References Cited

U.S. PATENT DOCUMENTS 5,582,734 A * 12/1996 Coleman et al. ............... 210/614
5,624,565 A * 4/1997 Lefevre et al. ................. 210/614
5,733,456 A * 3/1998 Okey et al. .................... 210/605
6,312,600 B1 * 11/2001 Audic et al. ................... 210/614
7,416,669 B1 8/2008 Carolan
7,544,299 B1 6/2009 Carolan

OTHER PUBLICATIONS

Chen et al. "Real-time control of an immobilized-cell reactor for wastewater treatment using ORP"; Water Research www.elsevier. com/locate/watres; (2002) pp. 230-238.*
Goronszy, M.C., Y. Bian, D. Konichi, M. Jogan and R. Engle, "Oxidation Reduction potential for nitrogen and phosphorus removal in a fed batch reactor," Proceedings of the 65th WEFTEC Conference, 1971.
Aqua-Aerobic Systems, Inc., "IntelliPro® Process Management System," Flyer, approx. 2007 (Rockford, IL, USA).
Aqua-Aerobic Systems, Inc., "IntelliPro® Process Management System," Brochure, Nov. 2006 (Rockford, IL, USA).
Aqua-Aerobic Systems, Inc., "IntelliPRO™," Memo, Feb. 10, 2006 (Rockford, IL, USA).
Aqua-Aerobic Systems, Inc., "Aqua Controls and SCADA Systems," Brochure, Aug. 2007 (Rockford, IL, USA).
Aqua-Aerobic Systems, Inc., "AquaExcel™ Batch Reactor," Brochure, Aug. 2006 (Rockford, IL, USA).
Aqua-Aerobic Systems, Inc., "Aqua MSBR® Modified Sequencing Batch Reactor," Brochure, Apr. 2010 (Rockford, IL, USA).

* cited by examiner

*Primary Examiner* — Maurice L McDowell, Jr.
(74) *Attorney, Agent, or Firm* — Niro, Haller & Niro

(57) ABSTRACT

A method for controlling and optimizing the treatment of wastewater in a batch reactor using the calculation and manipulation of ORP readings.

26 Claims, 13 Drawing Sheets

© 2011 Aqua-Aerobic Systems, Inc.

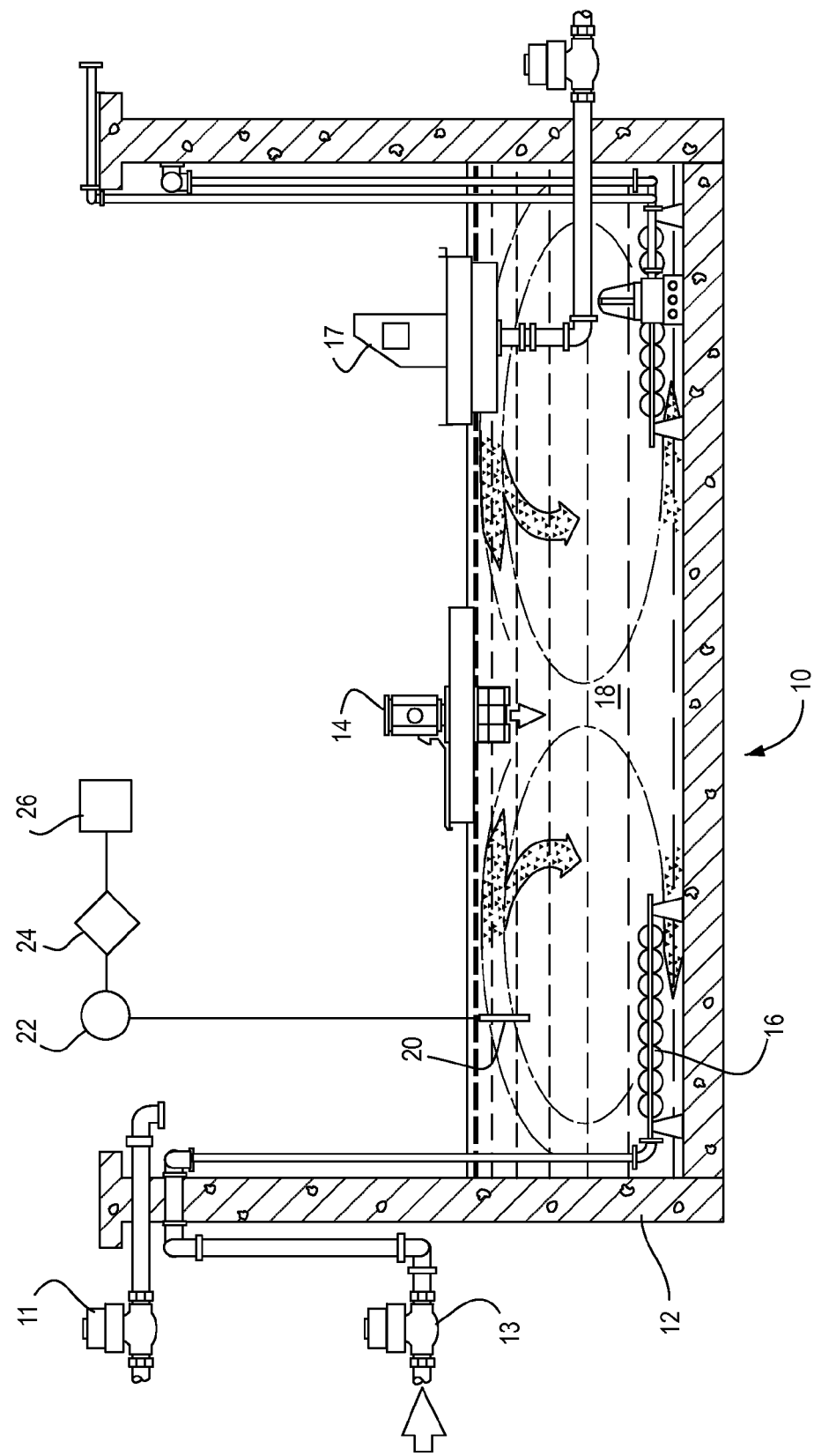

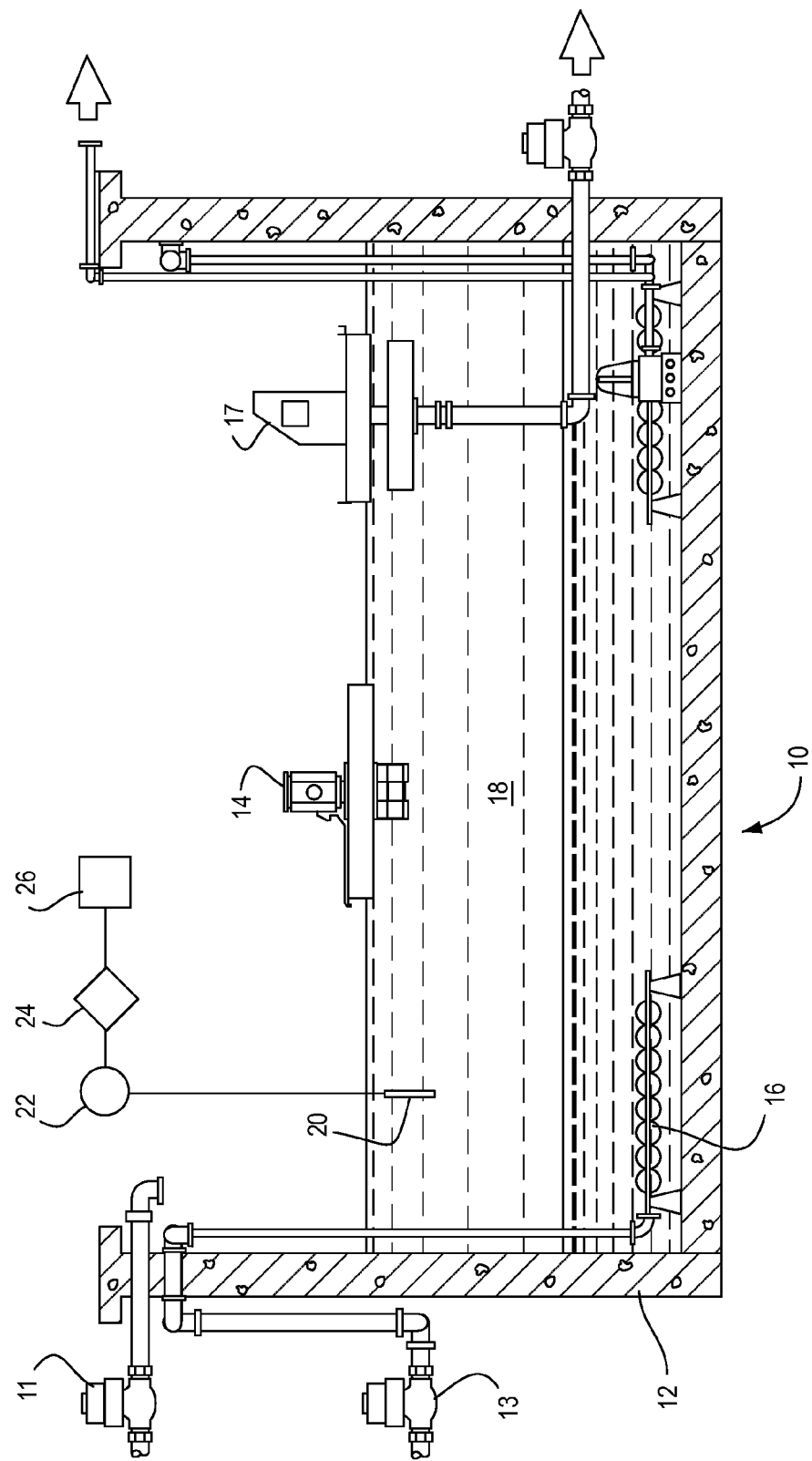

© 2011 Aqua-Aerobic Systems, Inc.

© 2011 Aqua-Aerobic Systems, Inc.

SOFTWARE SYSTEM AND METHOD FOR WASTEWATER TREATMENT CONTROL AND INTERPRETATION USING ORP

BACKGROUND OF THE INVENTION

The present inventions relate to monitoring, display and control systems for use in water and wastewater treatment. More particularly, the present inventions relate to the manipulation, transformation and display of oxidation-reduction potential data in intermittently aerated, batch wastewater treatment processes leading to meaningful process interpretation, as well as the control and optimization of such processes.

There are a variety of known systems which monitor and control the biological treatment of water and wastewater. Supervisory control and data acquisition (SCADA) systems, tailored to the needs of the water and wastewater treatment industry are typical. SCADA systems usually include sensors in a tank or basin, remote terminal units (RTU's) or programmable logic controllers (PLC's) that convert the signals from the sensors to digital data that is transferred to supervisory computers (PC's) which gather and process the data. The PC may be used to control a particular operation, such as the addition of chemicals and the duration of process phases. A display or monitor, typically associated with the PC, is also provided so that an operator may view and interpret the data and interact with the system. These systems may be active (i.e., they are used to directly control the process based upon data and without operator input) or passive (i.e., they inform the operator of process conditions and the operator acts on that information).

One system specifically designed for the needs of the water and wastewater treatment industry is the IntelliPro® process management and control system of Aqua-Aerobic Systems, Inc., Rockford, Ill. Unlike the SCADA systems typically used for control of an entire plant, the IntelliPro® system is specifically designed for more focused and specialized control of treatment plant subsystems, such as secondary biological processes, but may be used in conjunction with SCADA systems for overall plant, process or subsystem control. For example, the IntelliPro® system is particularly useful for control and monitoring of sequencing batch reactor (SBR) processes, as well as other secondary biological processes, such as membrane filtration and activated sludge systems.

Water condition parameters monitored in typical SBR control systems include dissolved oxygen (DO), pH, temperature, nitrates, phosphates, ammonia and the like. Oxidation Reduction Potential (ORP) has also been monitored and raw data displayed, typically as a plotted curve of ORP values over many cycles of operation (see FIG. 2). However, because of the nature and display of ORP readings, plant operators and others typically have not been able to use ORP data to meaningfully interpret and control process parameters, particularly in real time or substantially real time. This is because, for example, the value of an ORP reading of the reactor contents at any given point in time during a process does not necessarily equate to the particular state of a biological treatment process. In fact, it has been determined as part of the present inventions that only a comparison of the information including the slope of the plotted ORP curve (i.e., ORP value plotted over time), and changes thereto, provides meaningful state information, as discussed herein. Until the present inventions, meaningful ORP information, particularly in essentially real time, and the ability to determine and control treatment process operations based upon such readings, actively or passively, was unavailable.

Thus, when properly processed, manipulated and displayed as discussed herein, ORP can be a more reliable indicator of process condition or state of the reactor contents than many indicators currently used, such as dissolved oxygen. In particular and especially when used in conjunction with an SBR, the present inventions accurately determine the state of the contents in the SBR reactor, i.e., anaerobic, anoxic and/or aerobic (oxic), that can be used alone or with other data or water condition parameters for active or passive control and optimization of the treatment process. In addition, the present inventions overcome the problems and shortfalls associated with the use of ORP level readings from biological treatment processes, and provide a unique way to calculate, display and control wastewater treatment systems using ORP data, including the use of available spreadsheet software.

NOTICE OF CLAIM OF COPYRIGHT PROTECTION

A portion of the disclosure and drawings of this patent document contains material which is subject to copyright protection. The copyright owner has no objection to the facsimile reproduction by anyone of the patent document or the patent disclosure, as it appears in the U.S. Patent and Trademark Office files or records, but otherwise reserves all rights.

SUMMARY OF THE INVENTION

The present inventions preserve the advantages of known systems to monitor and control the treatment of water and wastewater, and also provide new features and advantages.

In a preferred embodiment of the present invention, a method of displaying the state of wastewater being treated in a batch reactor having a cycle time using ORP measurements is provided. The method includes measuring the ORP value of the liquid over a reactor cycle; plotting the ORP value over time to create an ORP curve; calculating the value of the slope of the ORP curve during a first period of time; calculating the value of the slope of the ORP curve during a second period of time; calculating the changes in value of the slope of the ORP curve between the second period of time and the first period of time, comparing the change in value of the slope of the ORP curve between the first and second periods of time with the slope of the ORP curves at first and second periods of time and with the actual ORP value at a third (or final) period of time to determine the status of the wastewater in the reactor; shading the plot of the ORP curve to reflect the state of the wastewater in the reactor based upon the determination of analyzed data; and, selectively displaying the plot of the ORP curve and the shading of the ORP curve to provide an illustration of the state of the reactor usable by the operator to control the treatment of wastewater.

The method of display of the present inventions may also include a step wherein the analyzed data is used to actively control selected phases of the treatment cycle. Additional reactor parameter condition data, including but not limited to DO, pH and/or temperature, which is superimposed, overlaid or otherwise shown with the display of the ORP curve and shading, may also be provided, alone or in combination.

The present inventions also provide a method of transforming and displaying data indicative of the state of the contents of a wastewater treatment reactor for active or passive control of the treatment process based upon ORP readings including the steps of: determining the ORP value of the reactor contents over time and plotting an associated ORP curve; calculating the slope of the ORP curve for a first period of time; calculating the slope of the ORP curve for a second period of time; calculating the change of slope of the ORP curve between the second period of time and the first period of time; comparing the slopes of the ORP curves, the change of slope of the ORP curve and the ORP value at the end of the second period of time and transforming said information to determine the state of the contents of the reactor; and, graphically displaying the state of the contents of the reactor.

The method may also include the graphic display of ORP values of the reactor over time, as well as other parameters or conditions of the contents of the reactor, all of which may be graphically displayed, alone or in combination, by overlay or other techniques along with the ORP value.

In another embodiment of the present inventions, a system of using programming software to manipulate ORP data obtained from a treatment reactor to determine the state of the contents of the reactor based upon ORP is provided. The system includes: obtaining ORP levels of the reactor contents over time from a probe or sensor in the reactor, including a first time, a second time and a third time; calculating a first slope of a curve of the ORP levels from a first time to a second time; calculating a second slope of a curve of the ORP levels from a second time to a third time; calculating the change in slope of the ORP curve between the second slope and the first slope; and, comparing the first slope, second slope and change in slope of the ORP curve with the ORP level from the reactor at the third time to determine a status of the contents of the reactor. The status of the contents of the reactor may then be used, for example, to determine whether the reactor needs more or less aeration time.

The present inventions further provide for a method of using ORP data to determine whether an aerobic and/or anoxic and/or anaerobic condition exists in a reactor including the steps of: determining the ORP value of the reactor contents over time and plotting an associated ORP curve; calculating the slope of the ORP curve for a first period of time; calculating the slope of the ORP curve for a second or subsequent period of time; calculating the change of slope of the ORP curve between the second period of time and the first period of time; comparing the slopes of the ORP curves, the change of slope of the ORP curve and the ORP value at the end of the second period of time and transforming said information to determine the state of the reactor; and, graphically displaying the state of the contents of the reactor. The method may also include the steps of providing a signal to an aerator depending upon the anoxic and/or anaerobic levels of the contents of the reactor, to turn the aerator on/off or to extend/shorten its period of operation.

In an additional embodiment of the present inventions, a method of determining the state or condition of the contents of a reactor in a batch treatment process having a cycle time for the treatment of wastewater is provided. Included are the steps of: measuring the ORP value of the contents of a reactor over a reactor cycle time; calculating the ORP value over cycle time sufficient to create an ORP curve; calculating the status of the slope of the ORP curve at a first period in time (M1) between a first period in time and a second period in time; calculating the status of the slope of the ORP curve at a second period in time (M2) between a third period in time and the second period in time; calculating the change in status of the ORP curve ($\Delta M$) between said second period of time (M2) and said first period of time (M1); comparing the status of the slope of the ORP curve of the first period of time (M1) with the status of the slope of the ORP curve at the second period of time (M2) with the change in status of the ORP curve between said first and second time periods ($\Delta M$) and with the ORP value at said third (or final) period in time to determine the state or condition of the contents of the reactor; and, repeating these steps for additional periods of the cycle time.

A system for determining the state of the contents of a wastewater treatment reactor using ORP is also provided. The system may include a PC capable of receiving information, directly or indirectly, from the reactor and of making calculations; an ORP sensor in the reactor in communication with the PC, the sensor providing ORP readings from the reactor to the PC; using the PC, calculating an ORP curve over time; calculating the value of the slope of the ORP curve at a first period in time; calculating the value of the slope of the ORP curve at a second period in time; calculating the value of the change in the slope of the ORP curve between the second period in time and the first period in time; comparing the values of the slope of the ORP curve at the first period in time, the value of the ORP curve at the second period in time, the value of the change in slope of the ORP curve and the ORP reading from the second period in time; and, using the comparison of values to determine the state of the contents of the reactor.

The system may also include an interface which is capable of displaying the calculated values. Similarly, the system may also include a display used by an operator to adjust the treatment process based upon the determined state of the contents of the reactor and/or wherein a signal is generated depending upon the state of the contents of the reactor, the signal being transmitted to a PLC to alter the treatment process depending upon the condition of the contents of the reactor.

All of the present inventions may, if desired, also account for the dead band or offset associated with the state of each treatment cycle.

Accordingly, it is an object of the present inventions to provide methods, systems and software to use ORP to effectively determine the state of the contents of a water and wastewater batch treatment reactor.

Another object of the present inventions is to provide a graphic illustration of the state of the contents of a treatment reactor.

An additional object of the present inventions is to overlay, superimpose or otherwise display selected and related parameters or measurements taken from the contents of a reactor, including but not limited to DO, pH, temperature, nitrates and the like, as well as phase times, aeration status, etc., to provide for effective passive or active control of the treatment process.

A further object of the present inventions is to transform ORP data into a form readily understood and useable by an operator and/or actionable automatically by the system for active control.

An additional object of the present inventions is to provide the substantially real time analysis of ORP data to determine the state of the contents of a reactor, which may be used to optimize aeration through the control of the aerator.

Still another object of the present invention is to use ORP data to distinguish whether an anaerobic condition has been reached in the reactor and use the information to improve enhanced biological phosphorus removal.

Still a further object of the present inventions is to effectively determine and/or display the knee or inflection points of changes in slope of an ORP curve for use in process control and optimization and/or the determination of the state of the contents of the reactor.

Still another object of the present invention is to use ORP data to determine whether an anoxic condition exists in a reactor and use the information to reduce nitrate levels through the control of aeration.

Still an additional object of the present inventions is to use commonly available programming, spreadsheet or other software which may be tailored to compile or manipulate ORP data to provide usable information for the active or passive control of the treatment process.

Yet another object of the present inventions is to account for the dead band or offset when collecting, manipulating or calculating ORP data.

Yet an additional object of the present inventions is the produce high quality and consistent effluent, manage energy usage and save on materials and labor.

Yet a further object of the present inventions is to use a PC, software or PLC to calculate, manipulate and display ORP data in order to determine the status of the contents of the reactor.

Yet still another object of the present invention is to incorporate some or all of the features, functions and objects into the IntelliPro® process management and control system, or other control system.

Yet still a further object of the present inventions is to use the ORP data to prevent the onset of anaerobic conditions during the React-Fill and React phases of operation to avoid unwanted secondary phosphorus release.

INVENTOR'S DEFINITION OF THE TERMS

The following terms which may be used in the various claims and/or specification of this patent are intended to have their broadest meaning consistent with the requirements of law:

Process or System, as used herein, shall mean any water or wastewater batch biological treatment process, including but not limited to SBR's, membrane biological reactors (MBR), activated sludge systems and the like. The process typically includes an influent, timed-based aeration control, a treatment cycle and the discharge of effluent.

Oxidation Reduction Potential (ORP), as used herein, refers to a measurement of the relative capacity or electrochemical potential of a solution (water or wastewater) to oxidize or reduce, and which may be indicative of the ability of water or wastewater to permit the occurrence of particular biological reactions.

ORP Probe, as used herein, shall refer to a device that measures the electrochemical potential of a solution using electrodes, the ORP readings for which are typically expressed in millivolts (mV).

ORP Curve, as used herein, shall refer to the plot, graphic representation of or information sufficient to calculate ORP values over time, typically one complete cycle of a water or wastewater treatment process such as an SBR.

ORP Reading/Value, as used herein, shall mean the average ORP reading over a timed sample interval immediately prior to the desired period. In a preferred but non-limiting embodiment, the interval may be one reading every minute for five minutes. Also included in ORP reading/value is an instantaneous reading of the ORP at a single point in time, if desired.

PC, as used herein, shall refer to a supervisory computer or any monitoring device capable of being programmed to obtain the data, make the calculations discussed herein and/or control the process discussed herein. Such a device may include, but is not limited to computers that operate using Windows®, Mac®, Android® or other operating systems.

Reactor, as used herein, refers to a tank, basin, lagoon or other receptacle where one or more batch treatment processes occur and which contains the liquid to be treated.

Dead Band or Offset, as used herein, refers to the period of time when ORP readings are not used to determine the condition of the process or system because initiation of the system (and particularly aeration) affects the accuracy of the probe sensor readings until system stabilization.

Display or Monitor, as used herein, shall mean any means of visually exhibiting, including visual representation on an electronic device, PC, human machine interface (HMI), printer, PDA, cell phone, tablet devices and/or screen and the like.

Where alternative meanings are possible, in either the specification or claims, the broadest meaning is intended. All words used in the claims are intended to be used in the normal, customary usage of grammar, the trade and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which:

FIG. 1C is a cross-sectional schematic view of a preferred embodiment of the SBR of FIG. 1A shown during the react phase;

FIG. 1E is a cross-sectional schematic view of a preferred embodiment of the SBR of FIG. 1A shown during the decant phase;

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

A preferred embodiment of the present inventions will be described as applied to a preferred embodiment of a sequencing batch reactor ("SBR"). It will be understood by those of skill in the art, however, that the present inventions may apply to a wide variety of biological batch, water and wastewater treatment systems, including membrane filtration, MBR's, activated sludge treatment and the like. The typical structure and operation of a preferred SBR system will be briefly described here for purposes of background and illustrating a preferred application, which is sold under the name of AquaExcel®, available from Aqua-Aerobic Systems, Inc. of Rockford, Ill.

In general, SBR 10 includes a batch reactor 12 where different processes or phases take place sequentially within the same reactor 12. Typically, influent flows into the reactor 12 through a pipe, conduit or through other well known means for the initial 25-50% of the treatment cycle (see generally FIGS. 1A-1E). The influent 11 is then treated in reactor 12, the treatment including a series of treatment phases. Upon completion of all of the phases, treated influent is expelled from the reactor 12 as effluent and constitutes the end of a cycle. The process then starts over again for the treatment of a new batch of influent. These treatment phases over a cycle of the reactor in the preferred embodiment are time based.

In the preferred SBR 10, there are five phases; namely, mix fill (MF), react fill (RF), react (R), settle (S) and decant (D). Other SBR 10 systems may have only four phases, namely, fill, react, settle and decant, as will be understood by those of skill in the art. Since the SBR employs a batch treatment process, reactor 12 begins the treatment cycle at 60-90% of the full operating depth or capacity of the reactor, as will be understood by those of skill in the art. As indicated, influent 11 is introduced, the reactor is filled and treatment occurs as discussed herein. Upon completion, the reactor is decanted to the initial depth or capacity of 60-90% full, and the process started again. It will be understood by those of skill in the art that the SBR description is merely representative of a preferred SBR and its operation, and is not a limit on the applicability of the present inventions.

Figure 1A:
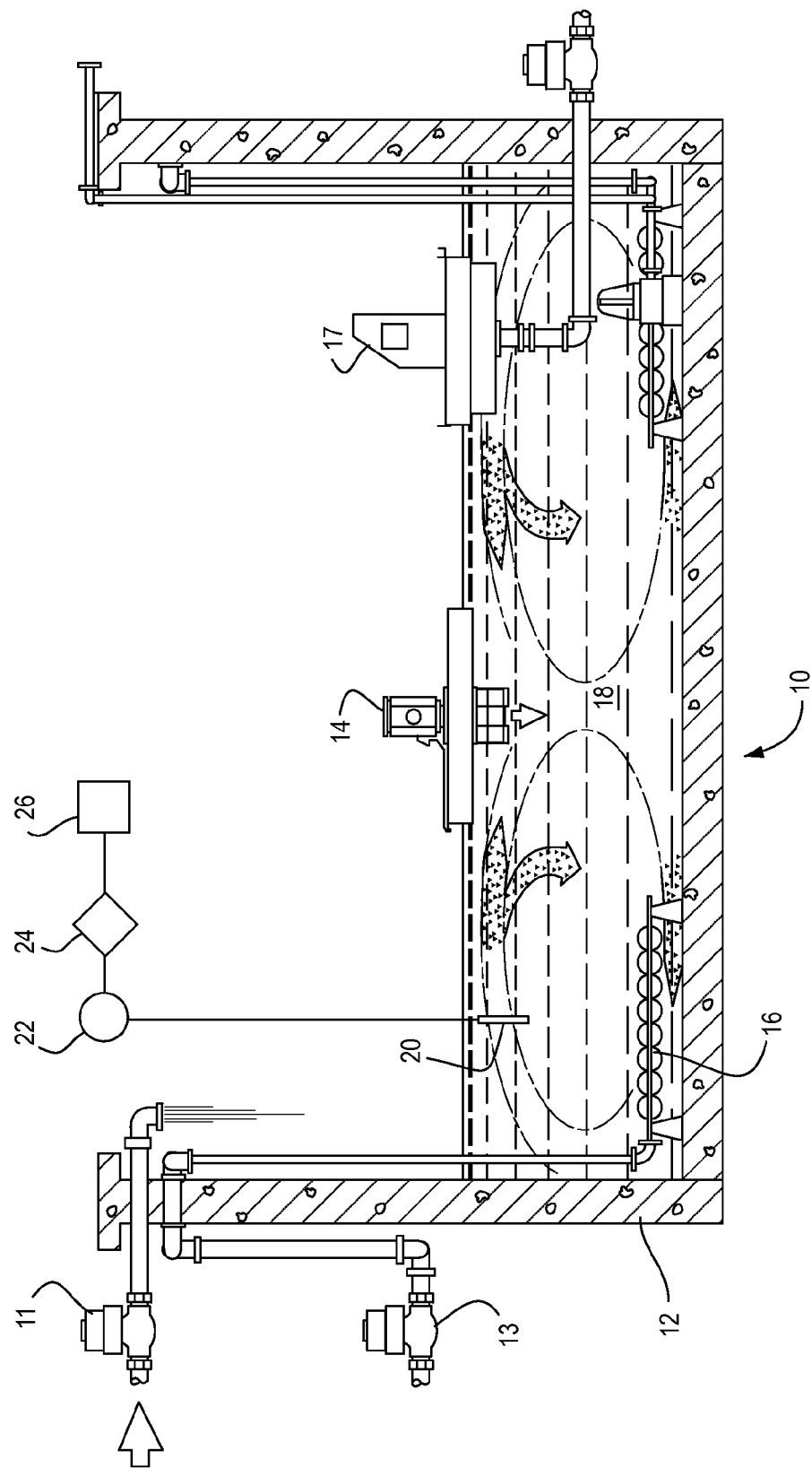
FIG. 1A is a cross-sectional schematic view of a preferred embodiment of an SBR shown during the mix-fill phase and including the major system components.

The mix fill phase is shown in FIG. 1A. In this phase, influent 11 is introduced into the reactor 12 and is mechanically mixed using a well known mixer 14 and without the use of aeration by an aerator 16. It will be understood by those of ordinary skill that the mix fill phase may alternatively be static, i.e., with no mechanical mixing. In the typical mix fill stage of the preferred SBR, which uses mechanical mixing, the contents 18 of the reactor 12 are initially in an anoxic condition, i.e., dissolved oxygen (DO) levels near zero with measurable concentrations of oxidized forms of nitrogen such as nitrates and nitrites. As mixing continues in the presence of influent 11 substrate, the contents 18 of the reactor 12 enter into an anaerobic condition, i.e., characterized as having essentially no DO and very low levels of oxidized nitrogen because of the lack of aeration. Because the reactor 12 is in the initial process of filling and there is no aeration being conducted (or in some systems, only limited aeration is being conducted), there is a certain period of time at the beginning of the cycle where ORP readings are inaccurate, since equilibrium of the reactor contents has not been reached from its previously stratified condition prior to the mix fill phase or initiation phase. This period of time, known as a dead band or offset, is accounted for by the present inventions by not calculating the state of the contents of the reactor using the ORP data as discussed below.

Figure 1B:
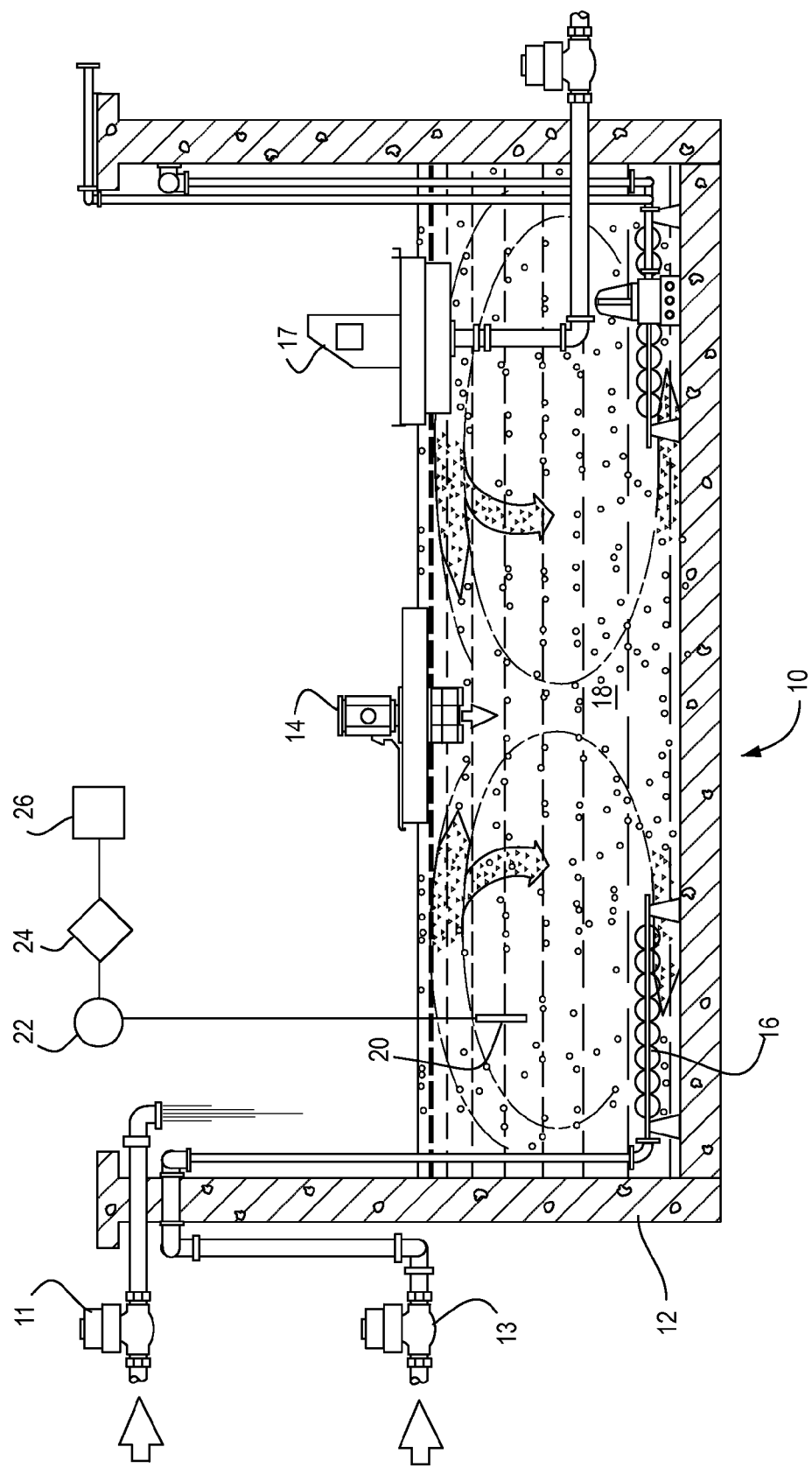
FIG. 1B is a cross-sectional schematic view of a preferred embodiment of the SBR of FIG. 1A shown during the react-fill phase.

During the react fill phase as shown in FIG. 1B, influent 11 continues to flow into the reactor 12 and aeration 16 is conducted for a portion of the phase, resulting in an aerobic condition, i.e., characterized as having a relatively high DO content (typically 1 to 4 mg/l). After a set period of time which is initially determined based upon estimated influent 11 quality, aeration is cycled on and off so that the contents of the reactor 12 are allowed to enter into altering states of aerobic and anoxic conditions. After the start of the react fill phase, and through the remainder of the cycle, it is preferred that the anoxic conditions not be allowed to persist long enough to develop an anaerobic environment as to prevent detrimental effects on the nutrient removal capabilities of the system. It is during this react fill phase and the active or passive control of the aerators based upon ORP calculations as discussed herein, to which the present inventions are particularly applicable, but not limited.

The next typical phase is the react phase as shown in FIG. 1C. During this phase, there is no longer any influent 11 flow into the reactor 12 as the reactor 12 has been filled with influent 11. Mechanical mixing 14 is typically conducted throughout this phase. However, aeration is cycled on and off so that the contents of the reactor 12 alternate between aerobic and anoxic conditions or simply to save energy if the target objectives have been met. The features and benefits offered by the present inventions are also equally applicable, but not limited to, the react phase.

Figure 1D:
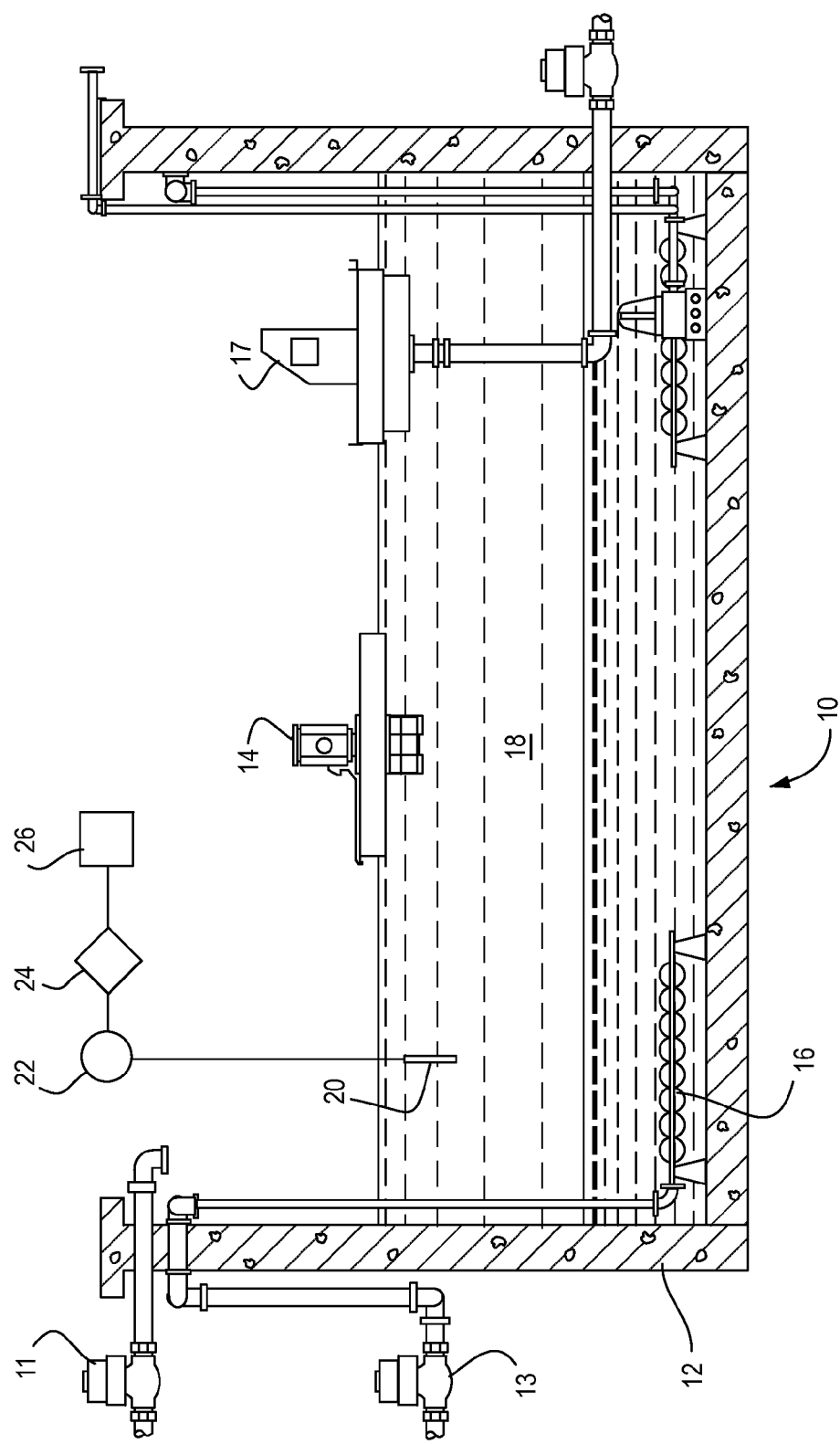
FIG. 1D is a cross-sectional schematic view of a preferred embodiment of the SBR of FIG. 1A shown during the settle phase.

The fourth phase is the settle phase as shown in FIG. 1D. In this phase, there is no mixing or aeration so that the solids may separate and settle to the bottom of the reactor.

The final phase is the decant phase of the preferred SBR process and is shown in FIG. 1E. In this phase, the supernatant is discharged, typically by decanting with a decanter 17 and the reactor 12 is ready to be refilled with the next batch of influent 11 and the process re-cycled as above.

The mechanical aspects of each of these phases is schematically shown in FIGS. 1A-1E. It will be understood that there are various types of SBR that have different phases, etc., but the present inventions apply to these variations. The present inventions also apply to other treatment processes as well.

In preferred SBR systems, an ORP probe 20 is attached to the sidewalls of the reactor 12 by well known means. A probe controller 22 is often associated and in communication with the ORP probe 20 and receives and translates the raw data from the probe 20. These components are typically purchased from third party vendors as will be known by those of ordinary skill in the art. As will be understood, the probe 20 and/or probe controller 22 may be integral or separate. The sources of acceptable probes 20, controllers and the like is also well known to those of skill in the art.

The probe 20 and/or probe controller 22 are typically connected to or otherwise in communication with a PLC 24. In the preferred SBR system, the PLC 24 typically runs and controls the SBR system 10, including such functions as opening and closing valves and instructing the blowers (not shown) to turn the aerators 16 on or off for purposes of aeration. In general, the phase times of the SBR cycles are pre-set into the PLC 24, which does not interpret or calculate the ORP or other data, but simply runs on set data points. These pre-set phase times are shown in the preferred horizontal bars on FIGS. 4, 5, 6, 7 and 9. Similarly, the aerator status is shown as a preferred horizontal bar under the phase information as shown on those Figures. As will be understood, these bars are a preferred display, but are not required and may take on a variety of other forms. These previously determined or pre-set settings are typically based upon experience of the designer and the overall type or quality of influent expected to be treated, as will be understood by one of ordinary skill in the art. However, the PLC 24 settings are adjustable, either by the operator or based upon instructions from a PC 26 as discussed herein.

In a preferred embodiment, the PLC 24 is connected to or otherwise in communication with a PC 26, which may be operated with Windows®, Mac®, Android® or other operating systems. In the preferred embodiment, PC 26 is utilized for the analysis, manipulation, interpretation and display of the ORP and other data. In addition, based upon the analysis and interpretation of the ORP data, the PC may adjust the aeration times based upon the desired condition of the reactor contents by, for example, overriding the PLC, or alternatively, by alerting (audibly and/or visually) the operator of these conditions via a display so that the operator may adjust the aeration time (see FIG. 9). In accordance with the present inventions, the operator may be notified by audible alert, viewing a display, email, text message or other means well known to those of skill in the art.

Figure 2:
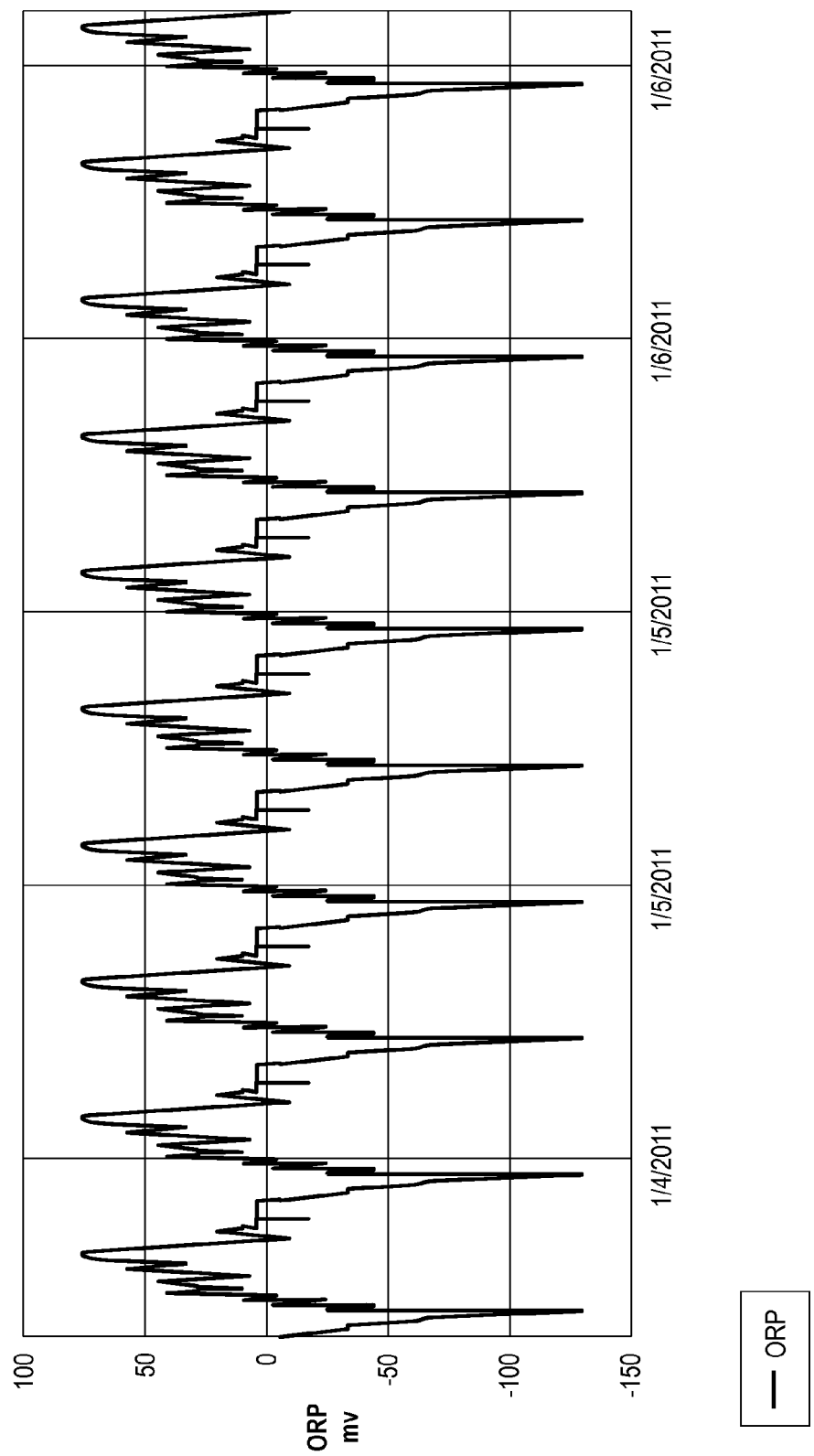
FIG. 2 is a graphic representation of ORP readings from a SCADA system of a biological reactor taken over time and showing the difficulty to an operator of using such readings in a meaningful way to control the process.

In the past, and until the present inventions, ORP values were typically plotted over long periods of time, for example, days or weeks, as shown in FIG. 2. Such charts were then studied by operators and others of skill in the art to determine, based upon their experience, whether adjustment to aeration times could or should be made. Notably, until the present inventions, meaningful adjustments could not be done on essentially a real time basis or with any useful accuracy.

In a preferred embodiment, ORP levels are monitored in the reactor using a probe 20 that provides information to a PLC 24 and/or PC 26. This data is then used to plot the ORP levels over time during each phase of the reactor cycle. Under the present inventions, the ORP level data readings are then manipulated to determine the knee or inflection point of the ORP curve which is in turn used in a comparison with other ORP values to determine the condition of the contents of the reactor, display the information and control the process, as desired. It should be noted that in some embodiments of the present inventions, it is not necessary to actually print or display the data or calculation. In some embodiments, it may be sufficient to obtain and store the information (via local or remote servers, etc.) in order to make the calculations and comparisons described herein. As indicated, the pertinent conditions or states (and condition or state changes) of the contents 18 of the reactor 12 are oxic/aerobic, anoxic and anaerobic. Also as previously indicated, it will be understood by those of skill in the art that an oxic/aerobic condition is one characterized by high levels of dissolved oxygen; the anoxic condition is characterized by essentially no dissolved oxygen but with the presence of nitrites or nitrates; and the anaerobic condition is characterized by essentially no dissolved oxygen and near zero levels of nitrites or nitrates.

Figure 3:
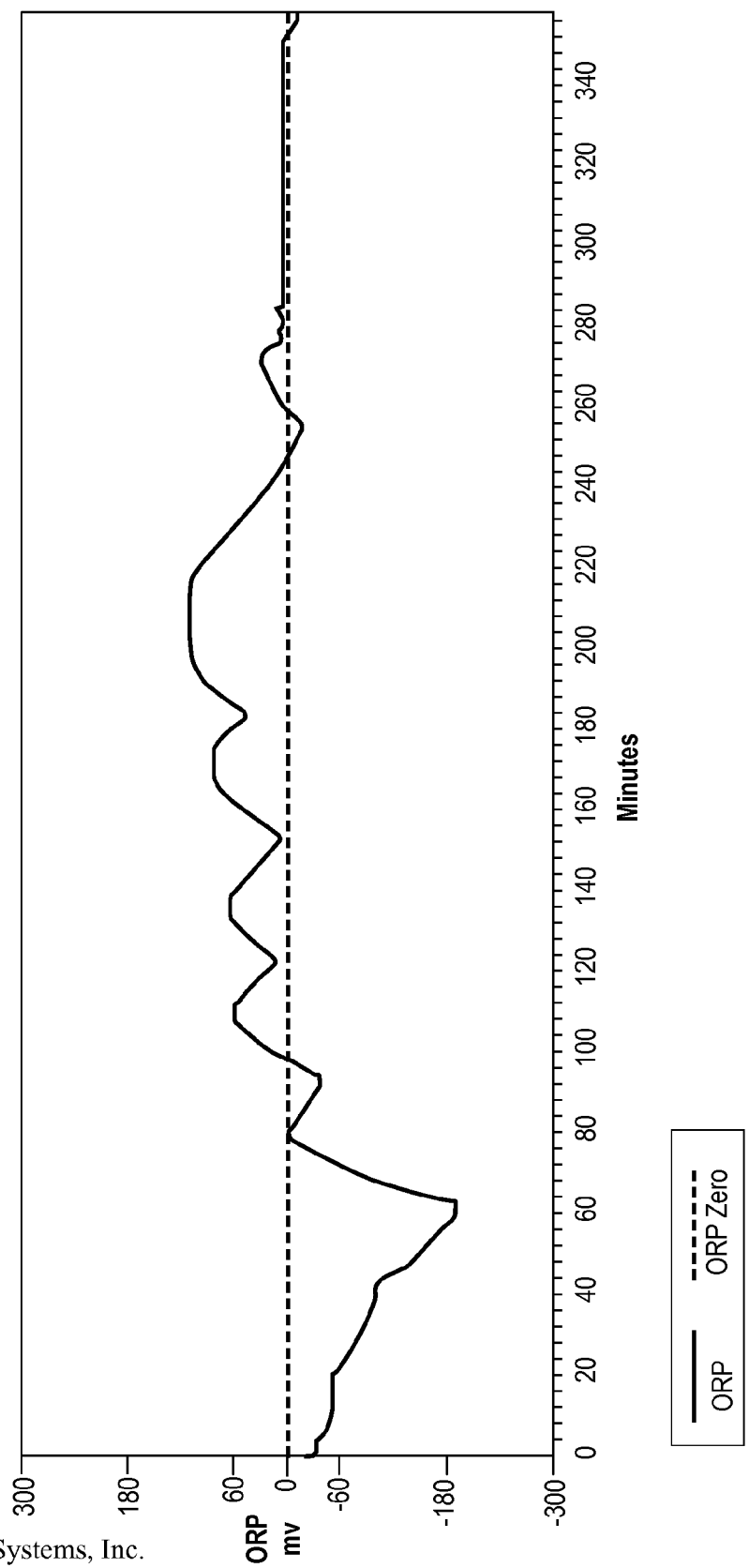
FIG. 3 is a graphic representation of the data of FIG. 2 expressed over one batch or cycle of the preferred SBR showing a plot of ORP readings taken over one treatment cycle and showing an improved way of expressing such readings to add meaning.
Figure 4:
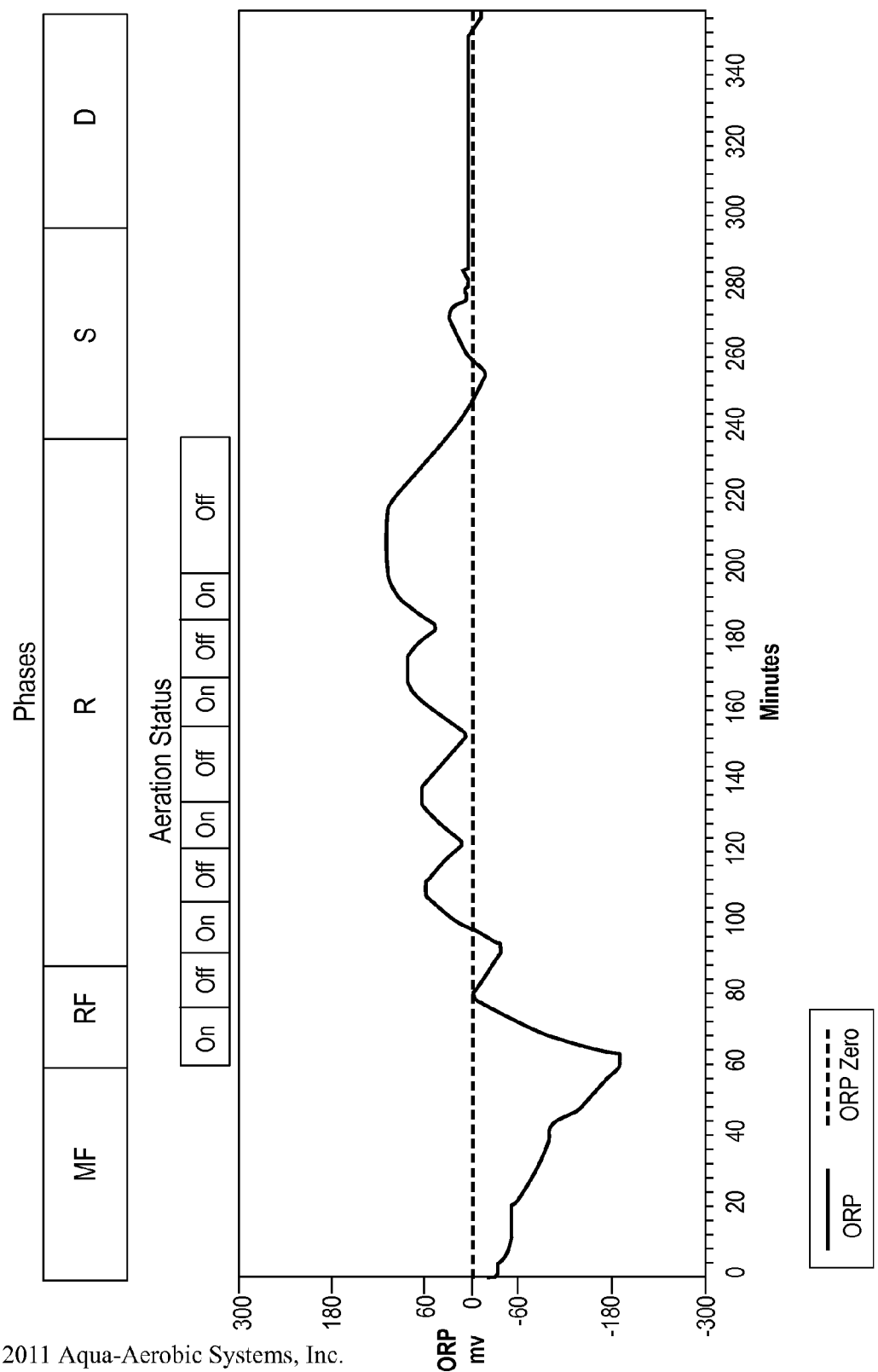
FIG. 4 is a representation of the preferred representative display of the present invention of one batch or cycle of the preferred SBR of FIG. 3, showing the ORP reading and also including an overlay bar of the aeration status of the reactor during the various phases of the reactor, also shown as a bar.

Typically, to plot the ORP values over time and develop an ORP curve as preferred, ORP readings are taken in the reactor every six seconds, although fewer or greater readings are acceptable. This raw ORP trend data is plotted as shown, for example, in FIG. 3. In FIG. 3 the ORP line is plotted over time and shows one cycle of operation of a preferred SBR. Also plotted along with the ORP readings of FIG. 4 is a preferred overlay of the phases of the SBR cycle, as well as the status of aeration during the various phases (i.e., either on or off). In a preferred embodiment, this phase and aeration status data is shown as a horizontal bar at the top of FIG. 4 (as well as FIGS. 5-7) and is obtained from the PLC 24 and superimposed on the display by PC 26. This may then be manipulated, for example, by software in a PC, as discussed herein, to optimize system performance and control.

The raw ORP data over time is then used to calculate the rate of change (or slope) of the ORP curve based upon ORP readings of the contents of the reactor. In this manner, the knee or inflection points of the ORP curve are then calculated. In a preferred embodiment, the value of the slope of two lines is calculated based upon three points that are the result of averaged time sample intervals, for example, a sample interval may be one minute long. It is the "status" of the slopes, i.e., either positive (+) or negative (−), in conjunction with the final ORP (e.g., positive or negative) value at that point in the process (i.e., the end of the third sample interval) that is used to determine the inflection or knee points of the curve and also the condition or state of the reactor. This is then used for active or passive control.

The calculation and/or manipulation of a preferred embodiment will be seen by reference to a non-limiting example, reflective of the first reading. First, the slope (M1) of the ORP curve is calculated. This is done according to the formula $M1=(ORP1-ORP0)/(T1-T0)$, where ORP0 is the average ORP reading over a timed sample interval immediately prior to an initial or starting time period referred to as T0. ORP1 is an averaged ORP reading over a timed sample interval immediately prior to a second point of time, T1. By reference to FIG. 8 (see also FIGS. 5-7), T0, i.e., the initial reading, will preferably be taken one sample interval immediately after the end of the dead band or offset. Assuming the dead band is ten minutes long, ORP0 is the reading at ten minutes plus a one minute sample interval, or eleven minutes (T0). Assuming, as preferred, that the slope calculation sample intervals are one every minute, OPR1 equals the average ORP reading of the interval ending at twelve minutes (T1) (from beginning of mix fill). Similarly, ORP2 is the average ORP reading of the interval ending at thirteen minutes (T2) and the instantaneous value of ORP taken at T2 is also the final ORP value.

Once the slope from T0 to T1 is calculated, the change of slope may then be calculated using slope data from succeeding or subsequent one minute intervals. For example, the slope (M2) from Time 1 (T1) to the slope at Time 2 (T2) is calculated according to the following formula: M2 (slope at Time 2)$=(ORP2-ORP1)/(T2-T1)$, where ORP2 is the ORP reading at T2 and ORP1 is the ORP reading at T1. Again, assuming that the sample interval is one minute, ORP2 is the ORP reading at thirteen minutes and T1 is the above ORP reading at twelve minutes.

To calculate the change of slope or inflection point ($\Delta M=M2-M1$), the slope at thirteen minutes is subtracted from the slope at twelve minutes. Succeeding slopes and changes of slopes are then calculated in the same manner every minute through a complete cycle of the SBR. Knowing the slopes, as well as the change in slopes set forth above, in conjunction with the final ORP value, the likely condition (process status) of the contents of the reactor may be determined as set forth in the following Table 1 (not in sequential or process order). Table 1 also shows the knee or inflection points, where appropriate, and the aeration status:

| M1 | M2 | ΔM | Final ORP Value | Process Status | Aeration Status |
|---|---|---|---|---|---|
| + | + | + | + | Oxic | Air On |
| + | + | + | − | Start of Oxic | Air Switched On |
| + | + | − | + | Oxic | Air On |
| + | + | − | − | Anoxic | Air On |
| − | − | + | + | End of Anoxic | Air Switched On |
| − | − | + | − | End of Anoxic or Anaerobic | Air Off |
| − | − | − | + | Start of Anoxic | Air Off |
| − | − | − | − | Start of Anaerobic (Inflection Point) | Air Off |
| − | + | + | + | Oxic | Air Switched On |
| − | + | + | − | Anoxic or Anaerobic | Air Switched On |
| + | − | − | + | Start of Anoxic (Inflection Point) | Air Switched Off |
| + | − | − | − | Anoxic | Air Switched Off |
| − | + | − | | Invalid Reading | |
| + | − | + | | Invalid Reading | |

In Table 1 (© Aqua-Aerobic Systems, Inc.) and as in the example, above:

M1=(ORP1−ORP0)/(T1−T0), which represents the slope from Time 0 to Time 1;

M2=(ORP2−ORP1)/(T2−T1), which represents the slope from Time 1 to Time 2; and

ΔM=M2−M1

In the preferred embodiment, the sample intervals between T0, T1 and T2 is one minute. And, ORP0, ORP1 and ORP2 are the average ORP value in the reactor at the associated time interval. The final ORP value is the average value of the ORP reading (in +/−millivolts) at the end time of the slope calculation. Also as shown in the preferred embodiment, the final ORP reading is the ORP reading taken at T2 for each calculation.

Research has revealed that a comparison of the slope of the ORP curve, the change of the slope of the ORP curve and the final ORP reading provide an accurate picture of the state or condition of the contents of the reactor. Those conditions are set forth in Table 1 above. With this knowledge, the process may be adjusted, for example, to provide for more or less aeration time. In this manner, the system may be optimized, resulting in better effluent quality, as well as energy and other savings. Thus, this information may be used to provide an operator with graphical information so that the operator may adjust the aeration time. Alternatively, the PC may process this information and automatically instruct the PLC to adjust aeration times as appropriate.

Figure 9:
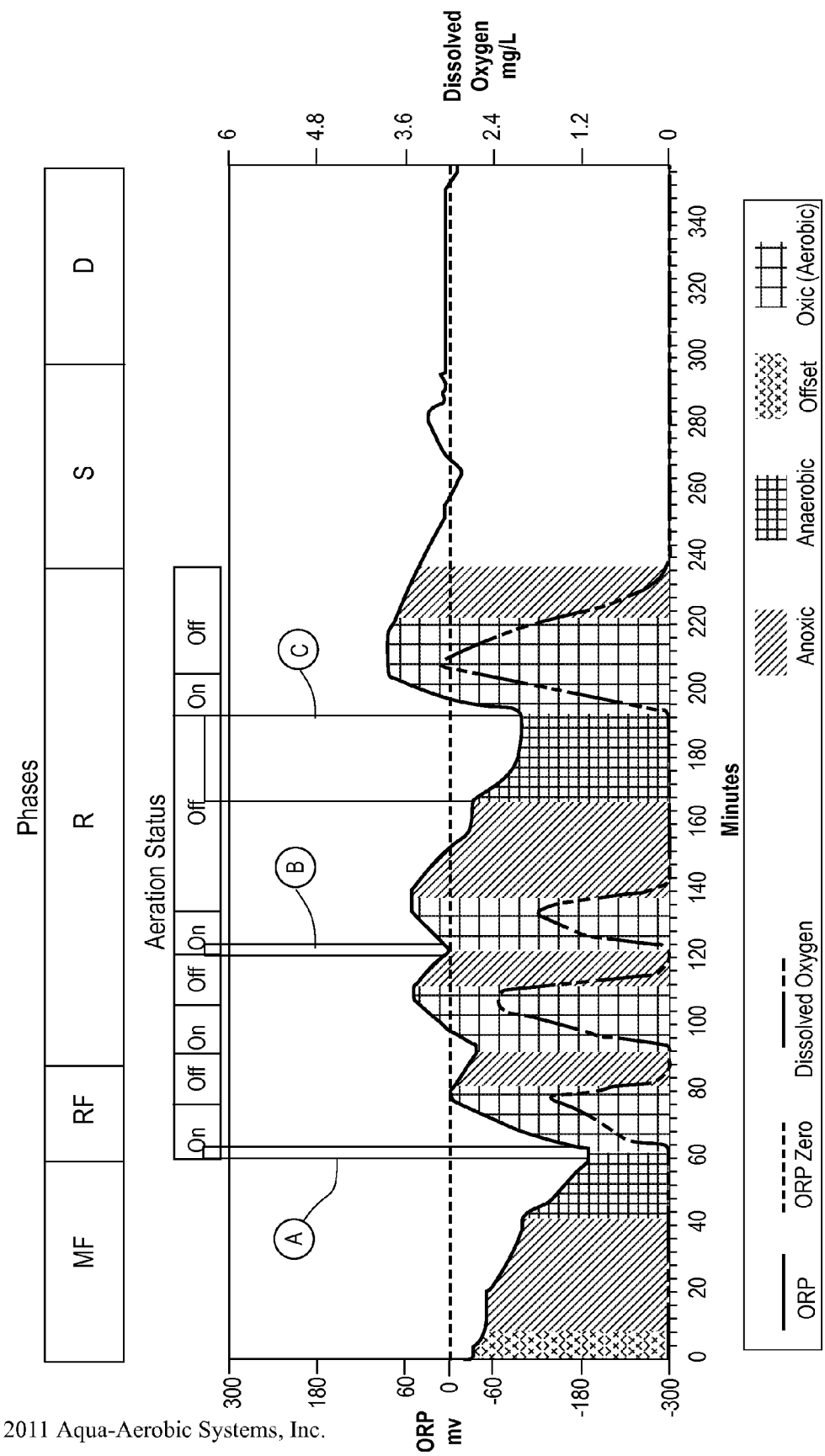
FIG. 9 is the representative display of FIG. 7, also including a representation of how the calculation of the present inventions may be used to control system operations, for example, the timing and duration of aeration based upon the ORP calculations of the present invention shown as vertical bars.

The applicability of the calculation, analysis, programming and/or display contemplated by the present inventions to a typical SBR system may be seen by reference to FIG. 9. As shown therein, the ORP curve is plotted and displayed as in the preferred embodiment. Underneath the ORP curve, the status of the contents of the reactor based upon the ORP slope calculation is highlighted, cross-hatched or otherwise shown in a variety of ways understood by those of skill in the art. The previously defined phases of the reactor are shown at the top of a typical display arrangement. The predetermined aerator status is also indicated on a preferred display as previously discussed.

FIG. 9 also shows three exemplary vertical bars A, B and C. These bars are one representative way of showing how the ORP calculation may be used to control the system. For example, during the mix-fill phase, it was previously determined by the designer as will be understood by a person of skill in the art, that it may be desirable for the reactor contents to have fifteen minutes in the anaerobic state. Those of skill in the art may desire as little as little as five minutes (or less) or as many as thirty minutes (or more) in the anaerobic state. Based upon the ORP calculations of the present inventions, it is determined that the reactor contents had insufficient time in the anaerobic state. In this situation, the operator may extend the anaerobic state by delaying the start of aeration the additional amount of time necessary to achieve the anaerobic time desired. This extension of the anaerobic state by delaying the start of aeration is shown as vertical bar A.

Similarly, it may be desirable for the contents of the reactor to be maintained in an anoxic state for fifteen minutes during the react phase. As indicated, this amount of time is merely an example, as one of skill in the art may make any necessary or desired adjustments. As shown by vertical bar B, if insufficient anoxic time has occurred, as determined based upon the present inventions, the start of the aeration may be delayed until the desired time has been reached.

It is also possible to provide additional aeration time with the present inventions. For example, if it is determined that the contents of the reactor exist in an anoxic state for an excessive amount of time during the react phase, and it is desirable to prevent the contents of the reactor from achieving an anaerobic condition, then the aerator may be turned on ahead of schedule based upon the ORP calculation allowing detection of an undesirable anaerobic condition. This is shown as vertical bar C in the representative display shown in FIG. 9. It will be understood that the aeration control based upon the ORP calculation may be active or passive.

One of ordinary skill in the art will also recognize, based upon this patent, what is needed to develop or program the software of the present inventions to be used on a PC or other computer apparatus. For example, one of ordinary skill in the art will first select available programming software with sufficient calculating power for the intended application, data evaluation and display if desired. This software is then programmed to perform the calculation and analysis of the ORP readings, slopes, knee point and other data, as discussed herein. For example, calculations will typically include the slope of the ORP curve at the desired periods in time, the change in slope of the ORP curve at the desired period in time. The programming will also include the comparison of the slopes of the ORP curve, the change in the slope of the ORP curve and the final value of the ORP levels of the contents of the reactor.

In addition, the programmer will typically include the ability to display the results and/or the raw data used in the ORP and other calculations that are desired. Audio or visual alert signals may also be included. The alerts and/or display may be used by the operator for passive system control. Moreover, if active system control is desired, the programmer may include instructions that automatically control system components depending upon the calculations made, such as the ORP calculations and the control of the aerators and/or blowers directly, indirectly or through a PLC, PC or other device.

Figure 5:
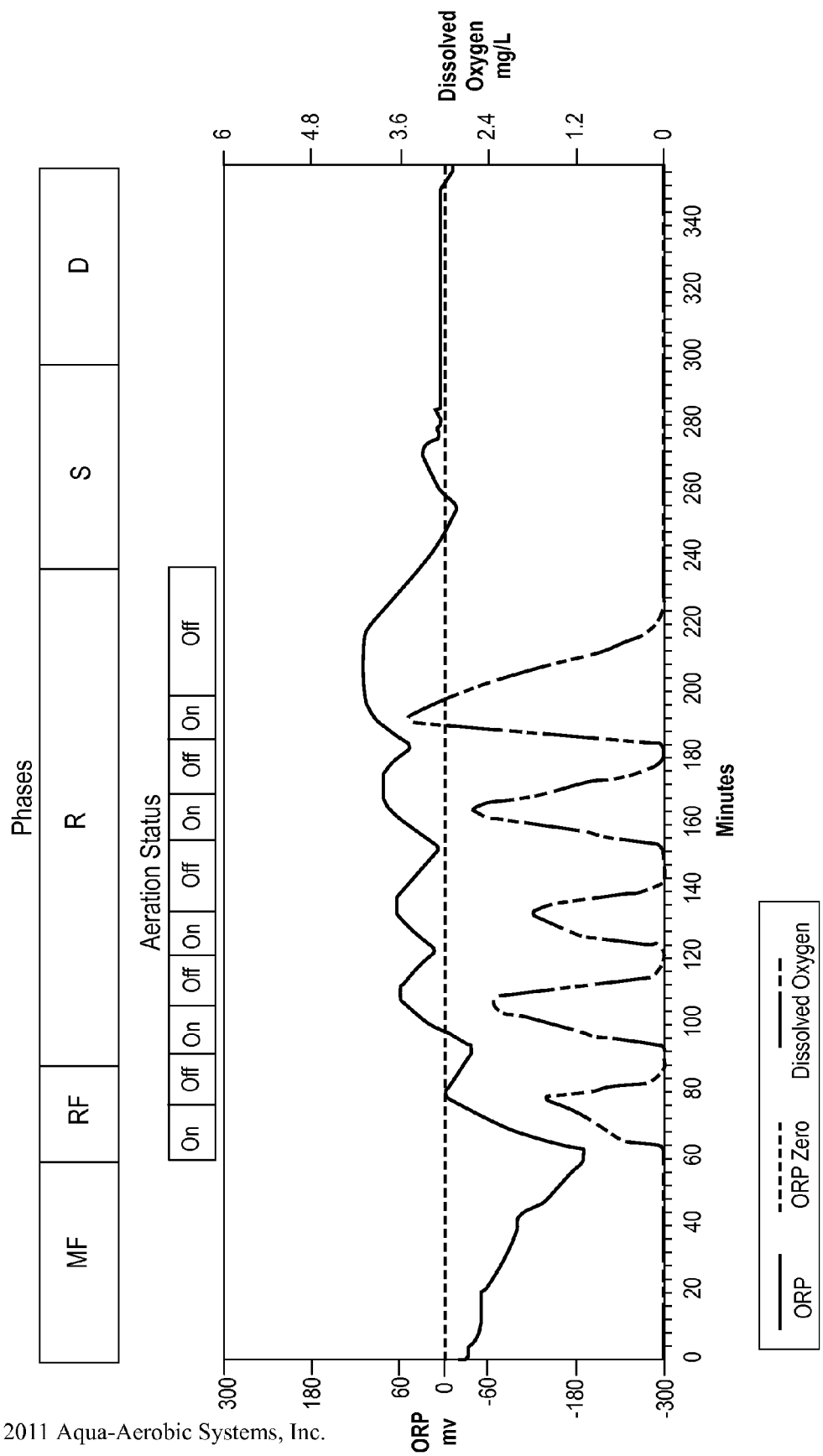
FIG. 5 is a preferred representative display of the present invention of FIG. 4, also showing a graphic display or overlay of the dissolved oxygen level as representative of other data that may be superimposed on the ORP and/or status display of a preferred embodiment.
Figure 6:
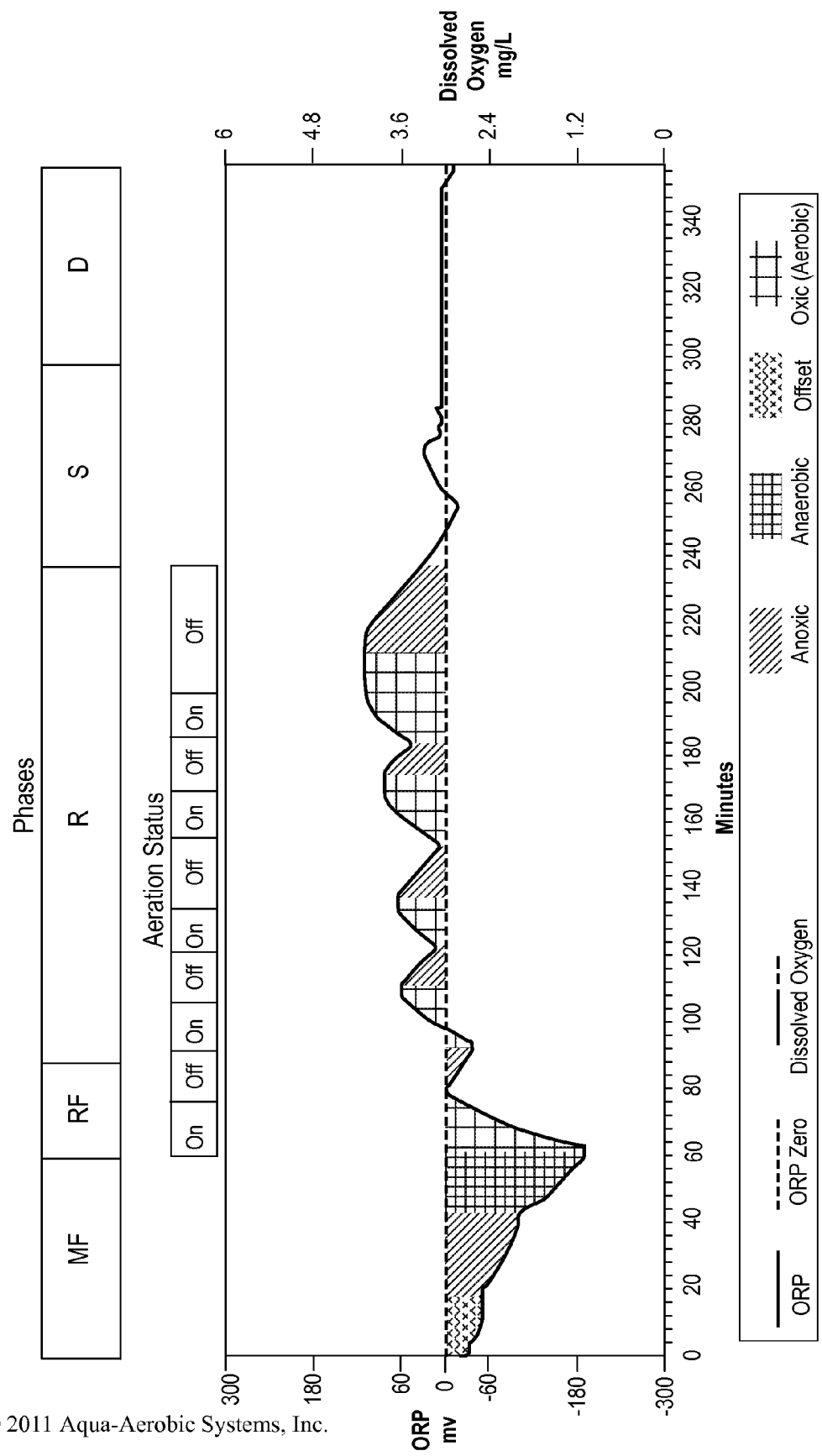
FIG. 6 is a preferred representative display of the present invention of FIG. 4, with the ORP curve shaded in a preferred manner to show the condition of the contents of the reactor over one batch or cycle of the reactor, with the shading reflecting the status of the reactor based upon the ORP calculations of the present inventions.
Figure 7:
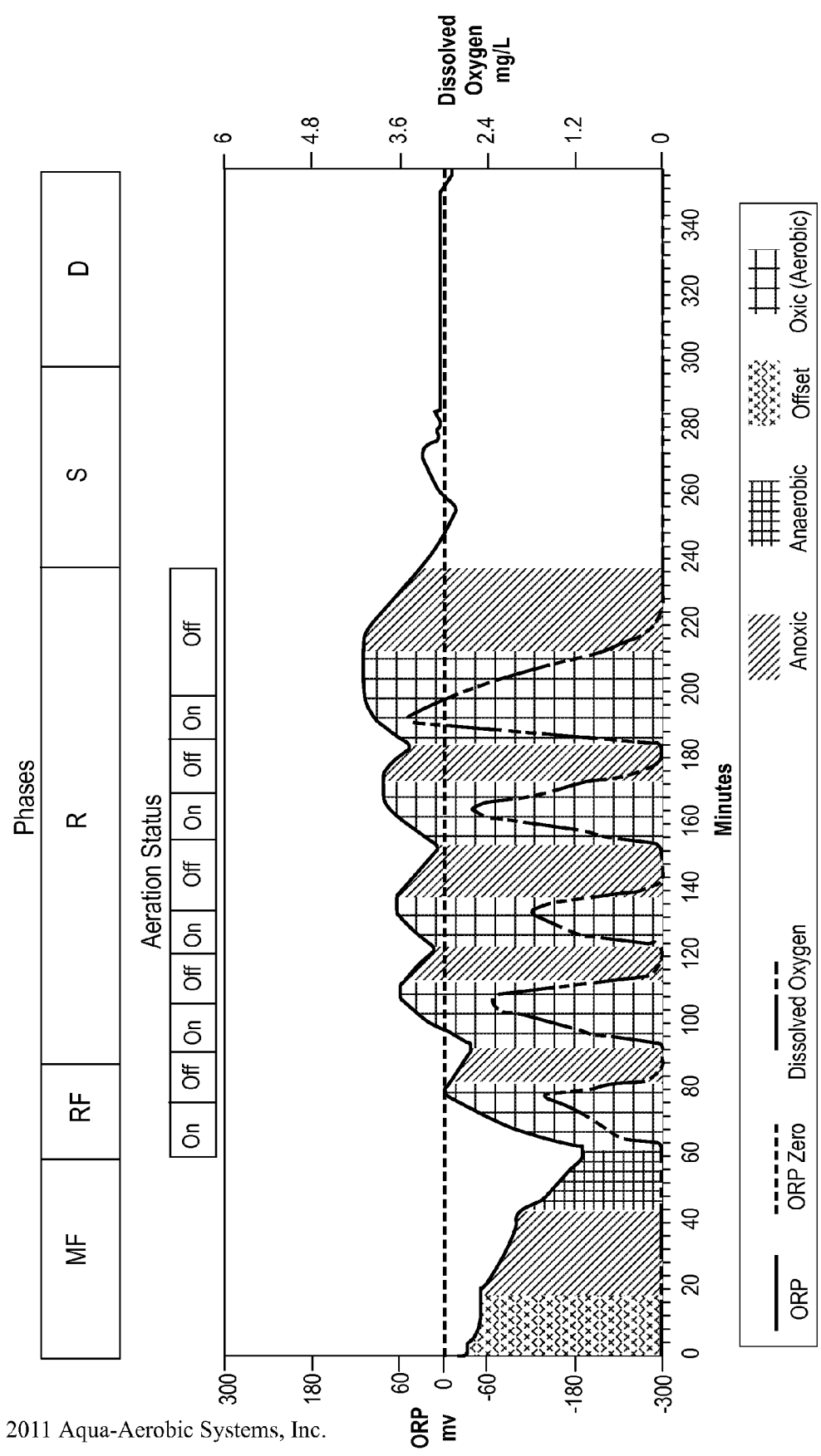
FIG. 7 is an alternative preferred representative display of the present invention of FIG. 4, including a graphic representation of the ORP and normalized dissolved oxygen level with shading below the ORP curve to show the condition of the contents of the reactor over one cycle or phase based upon the ORP calculations of the present inventions.
Figure 8:
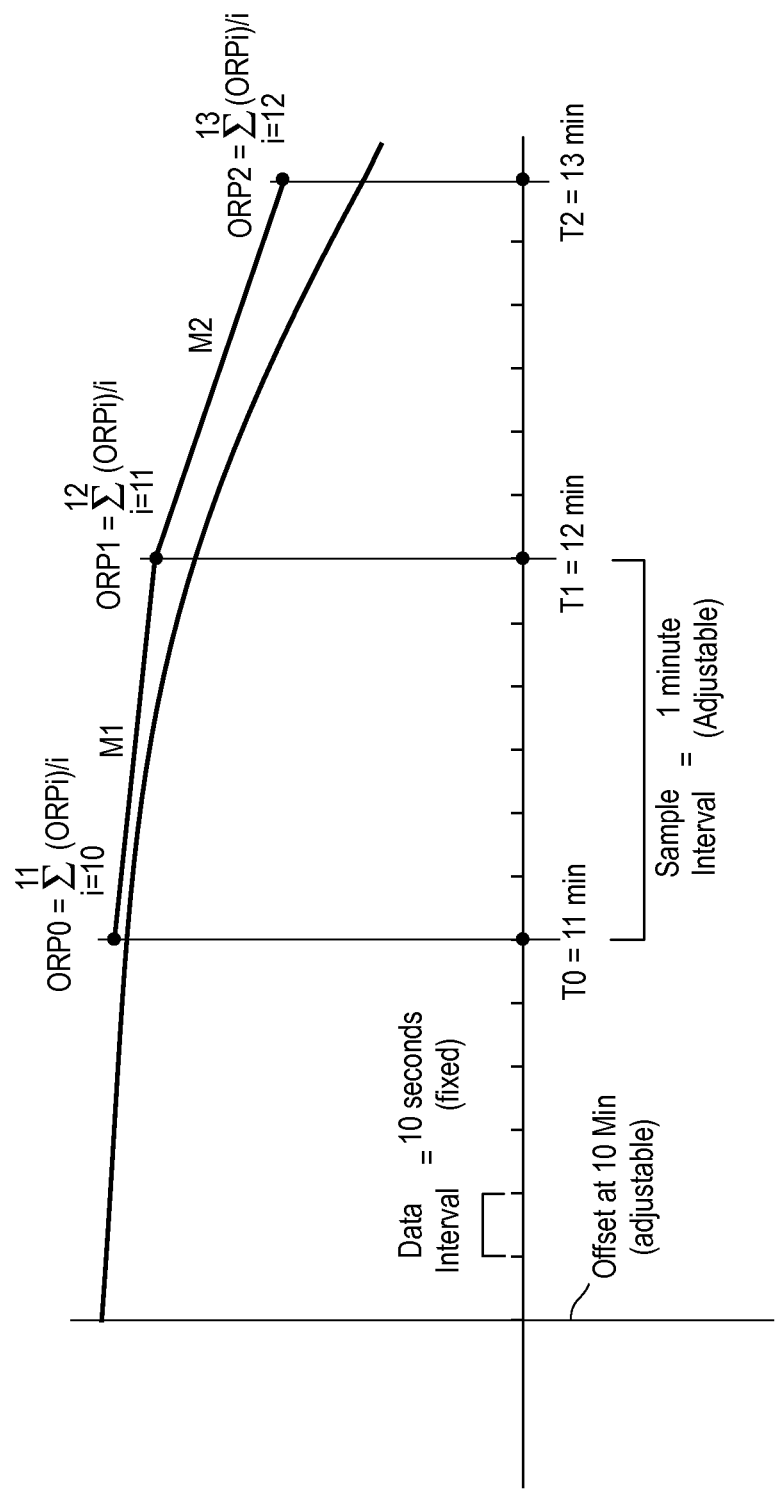
FIG. 8 is a representative example of a preferred calculation of the present invention after the dead band or offset.

Exemplary embodiments of a preferred display of the present inventions may also be seen in FIGS. 5-7, which may be part of an IntelliPro® or other system, if desired. In FIG. 5, a representative display of the present inventions is shown. In this embodiment, the phases of the reactor, the times for which are typically determined based upon predicted or typical influent information and set by the designer, is shown at the top. Similarly, the aeration status is also shown at the top. Also plotted are the actual ORP readings of the contents of the reactor shown over one treatment cycle. Also shown as an overlay are the normalized values of the DO level of the contents of the reactor. It will be understood in the art that other water or wastewater condition parameters such as pH, ammonia, phosphates, nitrates and the like, may be displayed as well. These readings may be normalized so that they are scaled to fit on the same display. FIG. 7 shows the plots of FIG. 5, with the area below the ORP curve highlighted as indicated to show the state of the contents of the reactor. The shading is determined based upon the ORP slope calculation of the present inventions. The dead band or offset is also shown.

FIG. 6 is the display of FIG. 5. Moreover, this figure shows an alternate way to display the state of the contents of the reactor based upon the ORP slope calculations. It will be understood that other ways to display (if desired) the state of the contents of the reactor are included within the scope of the present inventions.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A method of determining and displaying the state of wastewater being treated in a batch reactor having a cycle time, the state of the wastewater determined using ORP measurements and a PC including a display comprising the steps of:
    a) measuring the ORP value of the liquid over a reactor cycle using an ORP probe in the reactor using the PC;
    b) plotting the ORP value of the reactor contents over time to create an ORP curve;
    c) calculating the value of the slope of the ORP curve at a first period in time using the PC;
    d) calculating the value of the ORP curve at a second period in time using the PC;
    e) calculating the changes in value of slope of the ORP curve from the second period in time to the first period in time using the PC;
    f) comparing using the PC the slope of the ORP curve at the first period in time with the slope of the curve at the second period in time with the change in value of the slope of the ORP curve between the first and second period of time and with the ORP value at the end of the second period in time to determine the status of the wastewater in the reactor;
    g) shading the plot of the ORP curve to reflect the state of the wastewater in the reactor based upon the determination of analyzed data; and,
    h) selectively displaying the plot of the ORP curve and the shading of the ORP curve on the display to provide an illustration of the state of the reactor usable by the operator to control the treatment of wastewater.

2. The method of display of claim 1 wherein the analyzed data is used to actively control selected phases of the treatment cycle.

3. The method of display of claim 1 wherein additional data, including but not limited to DO, pH and/or temperature, is superimposed with the display of the ORP curve and shading.

4. The method of claim 1 wherein the first point in time is after the dead band.

5. A method of transforming and displaying data indicative of the state of the contents of a wastewater treatment reactor using a computer for active or passive control of the treatment process based upon ORP measurements comprising the steps of:
    a) determining the ORP value of the reactor contents over time using an ORP probe and plotting an associated ORP curve on a display associated with the probe and computer;
    b) calculating the slope of the ORP curve for a first period of time;
    c) calculating the slope of the ORP curve for a second period of time;
    d) calculating the change of slope of the ORP curve from the first period of time to the second period of time;
    e) comparing the slopes of the ORP curves, the change of slope of the ORP curve and the ORP value at the end of the second period of time and using said comparison to determine the state of the reactor; and,
    f) graphically displaying the state of the contents of the reactor on the display.

6. The method of claim 5 wherein the ORP values of the reactor over time are included in the graphic display.

7. The invention of claim 6 wherein the state of the contents of the reactor is graphically-displayed illustrated on the display by overlay under the ORP value.

8. The invention of claim 5 wherein other parameters of the contents of the reactor are determined using a suitable probe in the reactor and displayed on the display.

9. The method of claim 5 wherein the slope of the ORP curve for a first period of time is taken after the dead band or offset.

10. A system of using programming software in a PC to manipulate ORP data obtained from a treatment reactor to determine the state of the contents of the reactor comprising:
    a) obtaining ORP levels of the reactor contents over time from a probe in the reactor, said probe in communication with the PC, including a first time, a second time and a third time;
    b) calculating a first slope of a curve of the ORP levels from a first time to a second time;
    c) calculating a second slope of a curve of the ORP levels from a second time to a third time;
    d) calculating the change in slope of the ORP curve between the second slope and the first slope; and,
    e) comparing the first slope, second slope and change in slope of the ORP curve and the ORP level from the reactor at the third time to determine a status of the contents of the reactor.

11. The system of claim 10 wherein the ORP levels over time are displayed on a monitor associated with the PC.

12. The system of claim 10 wherein the status of the contents of the reactor is displayed on the monitor and which is superimposed with the ORP levels over time.

13. The system of claim 10 wherein the status of the contents of the reactor determines whether the reactor needs more or less aeration time.

14. The system of claim 10 wherein the first time is after the dead band or offset.

15. A method of using a PC in communication with an ORP robe in a er to obtain ORP data to determine whether an aerobic and/or anoxic and/or anaerobic condition exists in a reactor comprising the steps of:
- a) determining the ORP value of the reactor contents over time and plotting an associated ORP curve;
- b) calculating the slope of the ORP curve for a first period of time;
- c) calculating the slope of the ORP curve for a subsequent period of time;
- d) calculating the change of slope of the ORP curve from the first period of time to the second period of time;
- e) comparing the slopes of the ORP curves, the change of slope of the ORP curve and the ORP value at the end of the second period of time and using said comparison to determine the state of the reactor; and,
- f) graphically displaying the state of the contents of the reactor on a display associated with the PC.

16. The method of claim 15 including the steps of providing a signal to an aerator depending upon the anoxic and/or anaerobic levels of the contents of the reactor.

17. The method of claim 15 wherein the first period of time is after the dead band or offset.

18. A method of determining the state or condition of the contents of a reactor in a batch treatment process having a cycle time using a PC for the treatment of wastewater comprising the steps of:
- a) measuring the ORP value of the contents of a reactor over a reactor cycle time using an ORP probe in the reactor in communication with the PC;
- b) calculating the ORP value over cycle time sufficient to create an ORP curve;
- c) calculating the status of the slope of the ORP curve at a first period in time (M1) between a first period in time and a second period in time;
- d) calculating the status of the slope of the ORP curve at a second period in time (M2) between a third period in time and the second period in time;
- e) calculating the change in status of the ORP curve ($\Delta M$) between said second period of time (M2) and said first period of time (M1);
- f) comparing the status of the slope of the ORP curve of the first period of time (M1) with the status of the slope of the ORP curve at the second period of time (M2) with the change in status of the ORP curve between said first and second time periods ($\Delta M$) and the value of the ORP reading at said third period in time to determine the state or condition of the contents of the reactor; and,
- g) repeating steps a-f for additional periods of the cycle time.

19. The method of claim 18 wherein said values are used to control an aerator via communication with said PC to provide aeration of the contents of said reactor.

20. The method of claim 18 wherein the slopes are graphically displayed on a monitor associated with said PC.

21. The method of claim 18 wherein the first period in time is after the dead band or offset.

22. A system for determining the state of the contents of a wastewater treatment reactor using ORP, comprising:
- a) a PC capable of receiving information from the reactor and of making calculations;
- b) an ORP sensor in the reactor in communication with said PC, said sensor providing ORP readings from said reactor to said PC;
- c) using the PC, calculating an ORP curve over time;
- d) calculating the value of the slope of the ORP curve at a first period in time;
- e) calculating the value of the slope of the ORP curve at a second period in time;
- f) calculating the value of the change in the slope of the ORP curve between said second period in time and said first period in time;
- g) comparing the values of the slope of the ORP curve at said first period in time, the value of the ORP curve at the second period in time, the value of the change in slope of the ORP curve and the ORP level at said second period in time; and,
- h) using said comparison to determine the state of the contents of the reactor.

23. The invention of claim 22 wherein the PC includes a display which is capable of displaying the calculated values.

24. The invention of claim 23 wherein said display is used by an operator to adjust the treatment process based upon the determined state of the contents of the reactor.

25. The invention of claim 22 wherein a signal is generated depending upon the state of the contents of the reactor, said signal being transmitted to a PLC to alter the treatment process depending upon the condition of the contents of the reactor.

26. The system of claim 22 wherein the first period in time is after the dead band or offset.

* * * * *